June 2, 1936.  C. H. HAVILL  2,043,168
COMBINED GYRO COMPASS AND ARTIFICIAL HORIZON
Filed Oct. 19, 1932  3 Sheets-Sheet 1
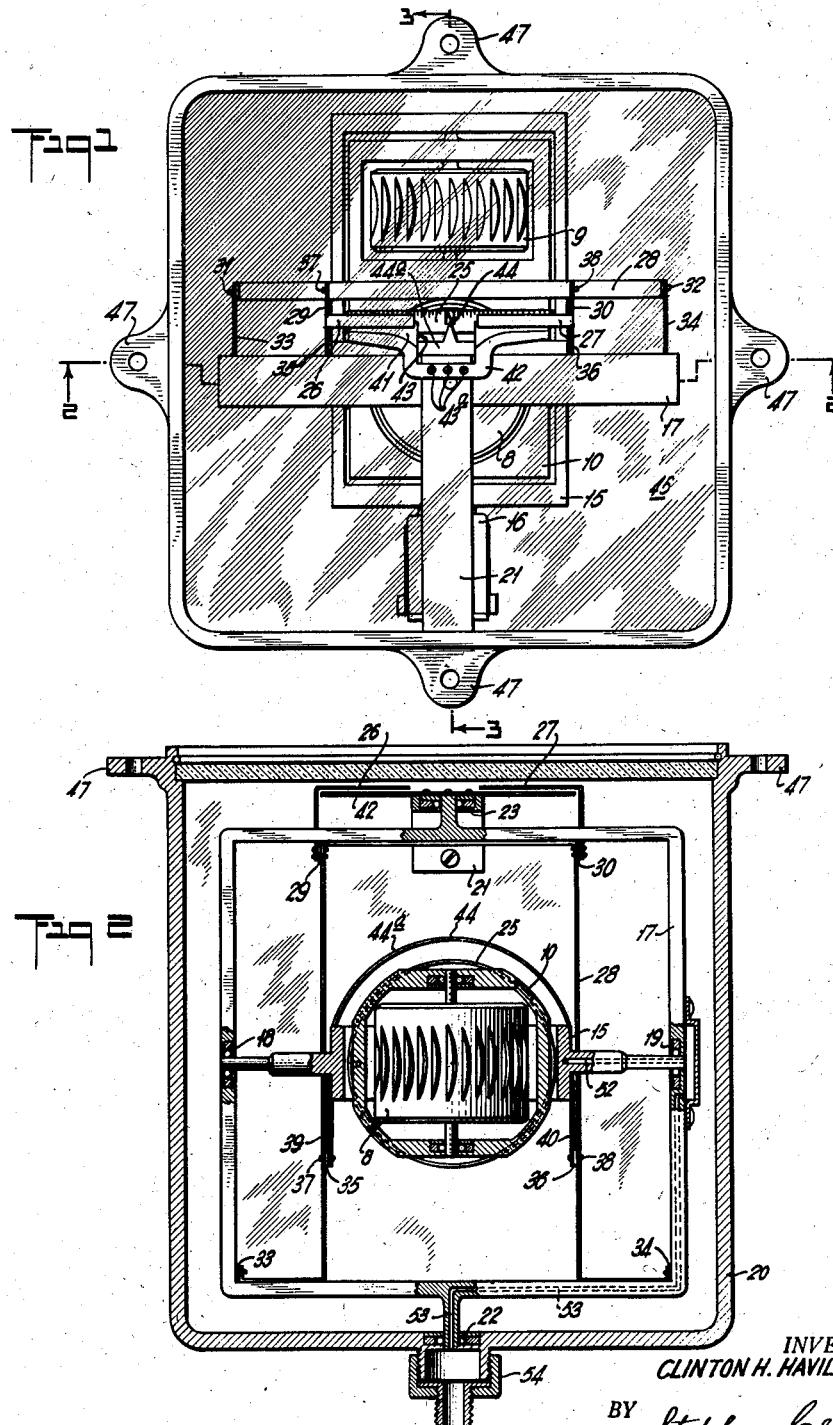
INVENTOR.
CLINTON H. HAVILL.
BY Stephen Cerstvik.
ATTORNEY.

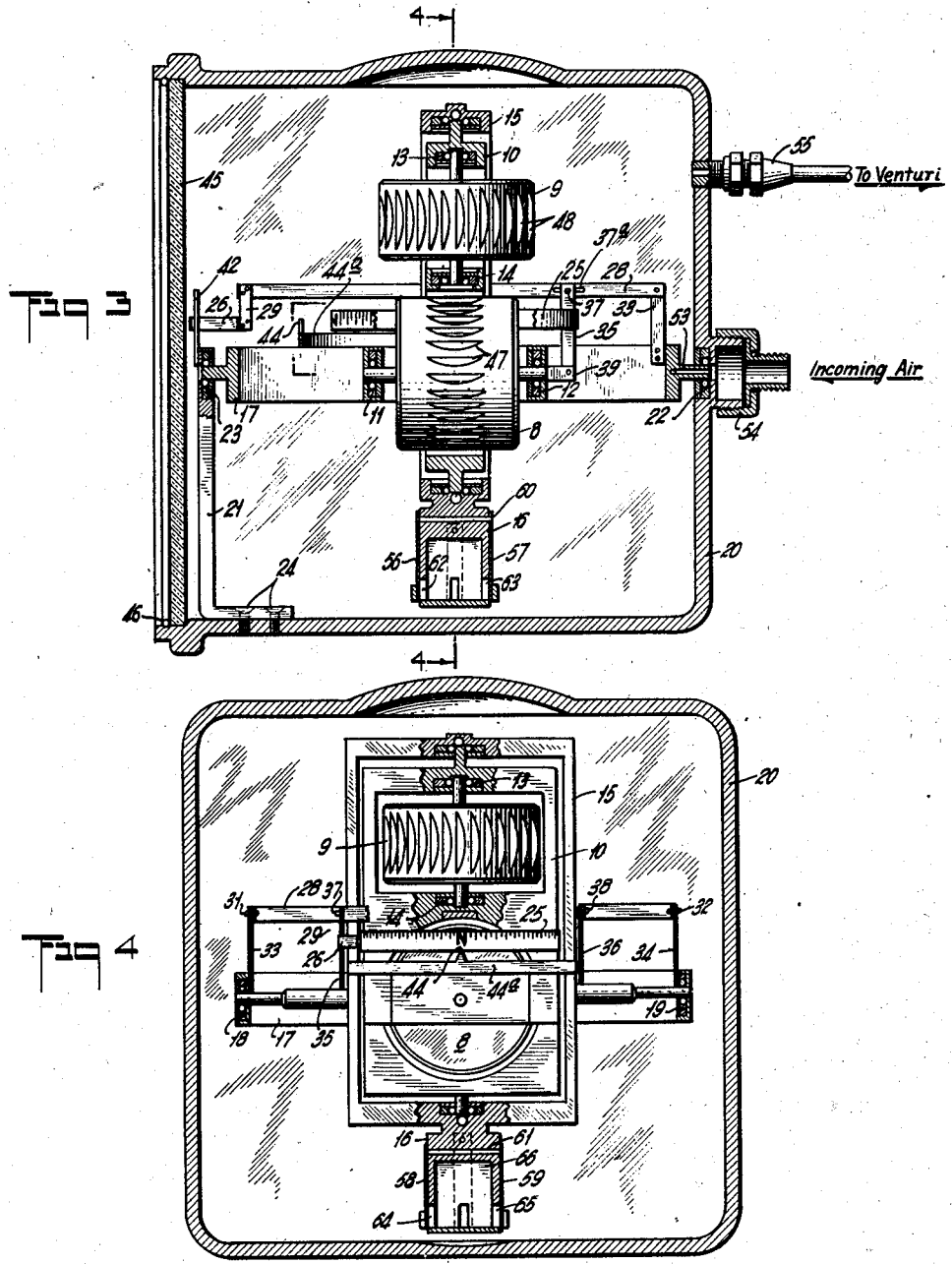

June 2, 1936. C. H. HAVILL 2,043,168
COMBINED GYRO COMPASS AND ARTIFICIAL HORIZON
Filed Oct. 19, 1932 3 Sheets-Sheet 3
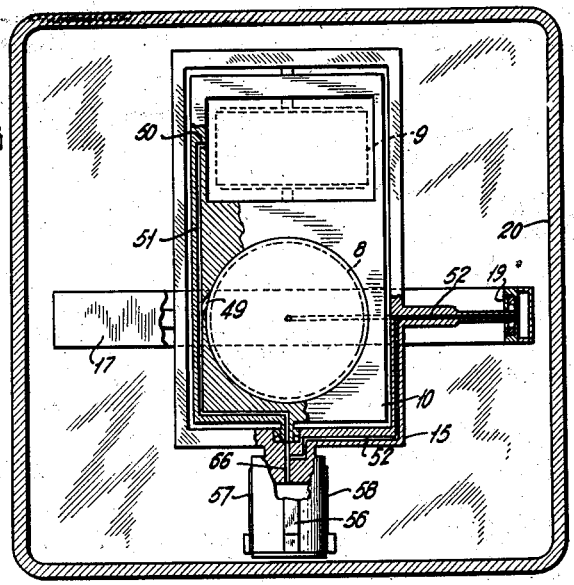
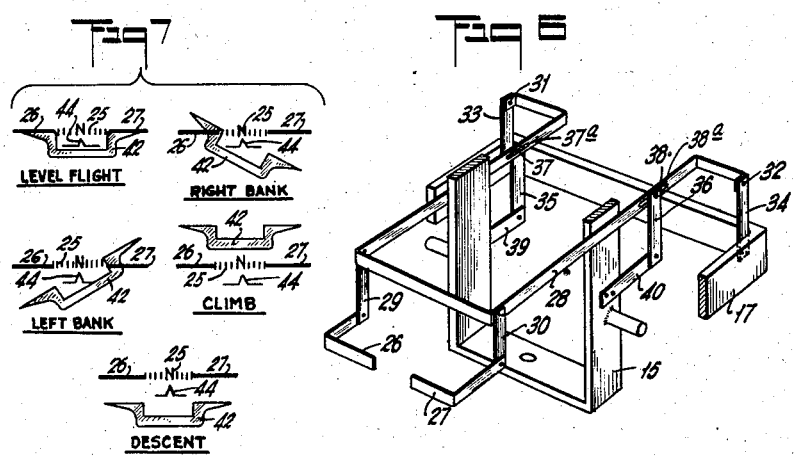
INVENTOR.
CLINTON H. HAVILL.
BY Stephen Cerstvik
ATTORNEY.

Patented June 2, 1936

2,043,168

UNITED STATES PATENT OFFICE 2,043,168

COMBINED GYRO-COMPASS AND ARTIFICIAL HORIZON

Clinton H. Havill, South Orange, N. J., assignor, by mesne assignments, to Eclipse Aviation Corporation, East Orange, N. J., a corporation of New Jersey Application October 19, 1932, Serial No. 638,608

6 Claims. (Cl. 33—204)

The present invention relates to gyroscopic devices and more particularly to a combined gyro-compass and horizon indicator.

Gyro-compasses and gyroscopic horizon indicators are both well known in the art but the former, as constructed heretofore, are cumbersome and too expensive and, therefore, not adapted for use on aircraft where space and weight are of greatest importance and where the cost of an instrument must be in reasonable proportion to the cost of the craft, while the horizon indicator, as constructed heretofore, is constituted as a separate instrument independent of the gyro-compass.

Accordingly, one of the objects of the present invention is to provide a novel instrument constituting a combined gyro-compass and horizon indicator and which is small, compact and light in weight and therefore particularly adapted for use on aircraft.

Another object is to provide a novel combined gyro-compass and horizon indicator whereby the compass direction of a craft carrying the same may be indicated simultaneously and in the same field of view with the attitude of the craft relative to the horizon and, hence, the use of separate instruments dispensed with.

The above and other objects and advantages of the invention will appear more fully hereinafter from a consideration of the detailed description which follows when read in connection with the accompanying drawings wherein one embodiment of the invention is illustrated. It is to be expressly understood, however, that the drawings are for the purpose of illustration and description only and are not to be construed as defining the limits of the invention, reference being had for this purpose to the appended claims.

In the drawings wherein like reference characters refer to like parts throughout the several views, Fig. 1 is a front elevation of one form of instrument embodying the present invention;

Fig. 2 is a longitudinal section taken on line 2—2 of Fig. 1;

Fig. 3 is another longitudinal section taken on line 3—3 of Fig. 1;

Fig. 4 is a transverse section taken on the line 4—4 of Fig. 3;

Fig. 5 is a detail view, partly in section, illustrating one arrangement for supplying fluid to drive the gyro rotors of the device;

Fig. 6 is a detail perspective view of one form of linkage employed for operating the horizon indicator; and Fig. 7 illustrates the manner in which the device of the invention indicates the attitude of the craft relative to the horizon.

As pointed out hereinbefore, the invention consists in combining a gyro-compass and a horizon indicator into a single instrument whereby the latter may indicate both the compass direction of the craft carrying same and the attitude of the latter with respect to the horizon.

Referring to the drawings and more particularly to Figs. 1 to 4, inclusive, the device embodying the present invention comprises, as shown, a pair of gyro rotors 8 and 9 journaled in a common frame 10 in any suitable manner, as for example, by means of ball bearings 11, 12 and 13, 14 for rotation about a horizontal axis and a vertical axis, respectively. The frame 10, in turn, is journaled for rotation about a vertical axis in another frame 15, the latter being made pendulous by means of a suitable weight 16 secured to or formed integral therewith. The frame 15 is arranged to swing about two horizontal transverse axes perpendicular to each other and, for this purpose, said frame 15 is journaled in a horizontal gimbal frame 17, as for example, by means of ball bearings 18 and 19. The gimbal frame 17 is also journaled at one end in a casing 20 and at its other end on a vertical support 21 by means of bearings 22 and 23, respectively, as shown in Figs. 2 and 3. The vertical support 21 may be secured to the bottom of the casing in any suitable manner, as by screws 24.

It will be seen from the above arrangement, and as is well known to those skilled in the art to which this invention appertains, that as the gyro rotors 8 and 9 rotate in their bearings about the horizontal axis and the vertical axis, respectively, the rotor 8, due to the action of the weight 16 will maintain its axis always horizontal and in the north and south meridian of the earth and, therefore, constitutes a true meridian seeking compass, while the rotor 9 will also, with the aid of the mass 16, maintain its axis vertical in view of the fact that the frame 15 within which the azimuth frame 10 is journaled is pendulously suspended by means of the gimbal frame 17, the casing 20 and the vertical support 21.

Means are now provided whereby the direction of the axis of the rotor 8 may be indicated in terms of compass direction, and for this purpose a compass card 25 is secured to the azimuth frame 10 in any suitable manner (not shown) so as to be rotatable therewith in the frame 15 and in such a manner that the north and south indications on the card are directly in line with the axis of the rotor 8, the north indication being at the left end of the rotor and the south indication at the right end of the rotor, as viewed in Fig. 3, when the craft on which the casing 20 is mounted is headed in the north direction.

Means are also provided for indicating the relative position of the vertical frame 15 and casing 20 whereby the attitude of the craft on which the casing is mounted may be indicated relative to the horizon. As illustrated in detail in the perspective view of Fig. 6, said means comprise a pair of transverse horizontally aligned members 26 and 27 bent inwardly at right angles and secured to a frame 28 in any suitable manner, as by means of connecting arms 29 and 30, respectively, said frame being pivoted at 31 and 32 in vertical arms 33 and 34, respectively, which are rigidly secured to the gimbal frame 17 so that the frame 28 moves with the gimbal 17 when relative angular movement takes place between the casing 20 and the gimbal 17 about bearings 22 and 23, which movement corresponds to a movement of the craft about its longitudinal axis. The frame 28 is also pivotally connected to the vertical frame 15 by means of a pair of vertical arms 35 and 36, the latter having pins 37 and 38 adapted to slide in slots 37a and 38a provided in the longitudinal arms of the frame 28, said arms 35 and 36 being carried by and movable with a pair of horizontal arms 39 and 40 which, in turn, are rigidly secured to the vertical frame 15 so that upon relative angular movement between the frame 15 and the gimbal ring 17, the arms 39 and 40 will cause the frame 28 to move in its pivots 31 and 32 by means of the pins 37 and 38 and arms 35 and 36, such movement corresponding to a movement of the aircraft about its transverse axis. Cooperating with the horizontal members 26 and 27, which represent the horizon line, is a fixed reference member 41 carried by a bracket 42 secured to the vertical fixed support 21 in any suitable manner as by means of screws 43a and, therefore, movable with the aircraft. The reference member 41 is preferably in a form simulating the wings of an aircraft but is provided with a cut-away portion 43 through which the compass card 25 may be viewed and a reading obtained from the card by means of a lubber's mark 44 formed on an arcuate member 44a (Fig. 4) carried by the vertical frame 15, said mark being located centrally of the arcuate member so that it may be viewed through the cut-away portion 43. It will, therefore, be apparent that when the plane dives, for example, the rear of the casing 20 will move downward, causing the frame 15 to move to the right relatively to the casing 20 (as viewed in Fig. 3). Such movement of the frame 15 will move the horizon frame 28 upwardly and, hence, the horizon members 26 and 27 will also move upwardly, giving an indication such as is apparent to the pilot when he can see the actual horizon, i. e. the horizon is going up while his craft is going down, the craft being represented by the fixed reference member 41. The reverse action takes place when the plane goes into a climb, i. e. the horizon line 26—27 goes down while the craft, as represented by member 41, goes up. The front of the casing 20 is closed by means of a suitable transparent member such as a cover-glass 45 secured to the casing as, for example, by means of a clamping ring 46, so that the compass card and the horizon members 26 and 27 may be viewed from the front of the instrument, the latter being adapted to be secured to an instrument panel by means of ears or lugs 47, the rear of the casing positioned in the direction of the nose of the aircraft.

Referring now to Figs. 3 and 5, the rotors 8 and 9 are adapted to be rotated about their respective axes by directing a jet of a suitable fluid, such as air, against a series of peripheral buckets 47 and 48 provided on the rotors 8 and 9, respectively. For this purpose there are provided a pair of nozzles 49 and 50 (Fig. 5) to which air is supplied through a passage 51 provided in the frame 10, which passage is in communication with a similar passage 52 provided in the vertical frame 15. The passage 52, in turn, communicates with a passage 53 provided in the gimbal 17, and the passage 53 is placed in communication with the atmosphere through a suitable stuffing box 54 provided at the rear of the casing 20. In order to supply air to the nozzles 49 and 50 the casing is, preferably, exhausted in any suitable manner, as by connecting the same to a Venturi tube (not shown) by means of a coupling member 55 and upon such exhaustion of the casing air is admitted through the stuffing box 54, the passage 53, the passage 52 and the passage 51, from the latter of which the air passes to the nozzles 49 and 50 which direct the air against the peripheral buckets 47 and 48 of the rotors 8 and 9, respectively. It will be apparent, however, that instead of connecting the casing to a venturi by means of the coupling member 55 the casing may be connected to a suitable source of positive pressure, such as a pump, by means of the stuffing box 54 so that air will be pumped into the casing and exhausted from the latter through the member 55.

Since the assemblage described above is pendulous it will be affected by acceleration forces acting along the longitudinal and transverse axes of the craft as well as by centrifugal forces when the craft is turning. The action of such forces would tend to cause the frame 15 to depart from its true vertical position and, therefore, means are provided for eliminating the effects of these forces. Such means may be of the type employed in a known form of an artificial horizon and comprising four weights 56, 57, 58 and 59, as shown in Figs. 3 and 4, said weights being suspended in pairs from rods 60 and 61, respectively, extending through the mass 16 at right angles to each other. The weight of each pair, however, is arranged so that it can move in only one direction on its pivoting rod, that is the weight 56 can move only in a direction towards the plane of the paper (Fig. 3) and the weight 57 can move only in a direction from the plane of the paper, while the weights 58 and 59 move in a corresponding manner when viewed in Fig. 4. In normally vertical positions, that is when no acceleration forces are present, the weights 56, 57, 58 and 59 are arranged to cover openings 62, 63, 64 and 65, respectively, provided in the mass 16, which extend into a chamber 66, the latter being in communication with the fluid supply passage 52 by means of a connecting passage 66 so that when any one of the openings is uncovered by movement of its associated weight air will be sucked into the chamber 66, thereby producing a reaction on the weight 16 in a direction opposite to the flow of air into the chamber. For example, if the opening 62 is uncovered by movement of the weight 56, the mass 16 will be urged to the left as viewed in Fig. 3, and if the opening 63 is uncovered by movement of the weight 57 then the mass will be urged to the right as viewed in Fig. 3. A similar action takes place by operation of the weights 58 and 59 but in a plane at right angles to the plane of the actions produced by the weights 56 and 57. However, due to the movement of the mass 16 by the reaction produced by the air entering the openings, the frame is caused to precess in a direction at right angles to the reaction, that is, the tendency of the mass 16 to move to the left in Fig. 3 will cause the frame 15 to precess in a direction towards or away from the plane of the paper depending upon the direction of rotation of the rotor 9. Therefore, the direction of movement of the weights 56 to 59, inclusive, should be so correlated with the direction of rotation of the rotor 9 that when acceleration or centrifugal forces act upon the weights and simultaneously upon the mass 16 the latter will be caused to precess in a direction opposite to that which the acceleration or centrifugal forces are acting, thereby maintaining said mass in a true vertical position at all times irrespective of the presence of any such disturbing forces. Although the reaction forces acting on the mass 16, and hence the frame 15, will also cause a slight precession of the compass frame 10 due to the gyroscopic action of the rotor 8, thus tending to disturb the azimuth indication of the compass, nevertheless, such disturbances are only momentary and present only during an acceleration or deceleration and/or turning of the craft upon which the device is mounted and, therefore, the rotor 8 will again align itself with the plane of the meridian as soon as the craft is in level flight.

Referring to Fig. 7, there are shown several of the indications which may be produced by the instrument embodying the invention for various attitudes of the craft with respect to the horizon as, for example, level flight, right bank, left bank, climb and descent. Of course various combinations of movements will be indicated accordingly.

From the foregoing it will be seen that, due to the whole assemblage being pendulous and maintained in a true vertical position at all times by the action of the rotor 9 and the action of means for eliminating acceleration and centrifugal effects, the gyro rotor 8 will cause the compass card 25 which is carried thereby to indicate the compass direction of the craft on which the device is mounted, and the horizontal members 26 and 27 carried by the frame 28 will give indications of the attitude of the craft with respect to the horizon, thus providing a single instrument embodying a novel structure whereby both indications may be viewed simultaneously in a single view and, hence, making it unnecessary for the pilot to direct his attention alternately to two separate instruments.

Although only one embodiment of the invention has been illustrated and described in detail, various changes in the form and relative arrangement of parts, which will now appear to those skilled in the art, may be made without departing from the scope of the invention. Reference is, therefore, to be had to the appended claims for a definition of the limits of the invention.

What is claimed is:

1. In combination, a frame, a pair of gyroscopes journaled in said frame and adapted for rotation about a horizontal axis and a vertical axis, respectively, a second frame, said first frame being journaled in said second frame for rotation about a vertical axis in line with the vertical spin axis of the gyroscope, a fixed support, means pendulously mounting said second frame on said support for angular movement about two horizontal axes perpendicular to each other whereby said first frame is caused to precess in the second frame until the axis of the horizontal gyroscope is aligned parallel to the meridian, a compass card carried by said first frame, a lubber mark carried by the second frame and cooperating with the compass card to indicate the azimuth position of the fixed support relative to the meridian, means pivotally connected to said second frame and said mounting means therefor, indicating means operated by said last-mentioned means for movement in synchronism with said second frame relative to the fixed support, and a reference index carried by the fixed support and cooperating with said indicating means to indicate the attitude of the fixed support with respect to the true horizon.

2. In combination, a frame, a pair of gyroscopes journaled in said frame and adapted for rotation about a horizontal axis and a vertical axis, respectively, said axes being fixed relatively to said frame, a second frame, said first frame being journaled in said second frame for rotation about a vertical axis, a weight on the lower part of said second frame, a fixed support, means pendulously mounting said second frame said gyros and said first frame on said fixed support for angular movement about two horizontal axes perpendicular to each other whereby said first frame is caused to precess in the second frame by the action of the weight until the axis of the horizontal gyroscope is aligned parallel to the meridian, means associated with said weight for eliminating the effects of undesirable disturbing forces on said pendulous gyroscope frame, a compass card carried by said first frame and cooperating with a lubber mark carried by the second frame for indicating the direction of travel, and means operatively connected to said second frame and the mounting for indicating the angular position of the second frame with respect to the fixed support.

3. In combination, a casing, a frame within said casing, two gyroscopes mounted in said frame with their spin axes horizontal and vertical, respectively, and relatively fixed in said frame, a second frame supporting said first frame for precession about a vertical axis coinciding with the axis of the vertical gyroscope, a gimbal support carried by the casing for pivotally supporting the second frame the first frame and the gyros for relative movement about two horizontal axes perpendicular to each other, means including a continuous passage from the exterior of the casing through the gimbal support, the second frame and the first frame for directing a fluid under pressure against the peripheries of the gyroscopes for driving the latter, means for making the second frame pendulous whereby the horizontal gyroscope is caused to precess until its axis is in the earth's meridian and the vertical gyroscope is effective to maintain a true vertical position, and means operatively associated with said frames for respectively indicating the positions of the axes of said gyroscopes relative to the meridian and to a plane parallel to the earth's surface.

4. In combination, an instrument casing adapted for mounting on a substantially vertical instrument panel and having a cover glass at the front thereof, a pair of gyroscopes mounted in said casing with their spin axes horizontal and vertical, respectively, gimbals in said casing and carrying said gyroscopes for simultaneous movement of their spin axes about two mutually perpendicular horizontal axes, means for maintaining the spin axes of said gyroscopes horizontal and vertical, respectively, and for causing the axis of the horizontal gyroscope to align itself parallel with the plane of the meridian, thereby making said gyroscope function as a true meridian seeking compass, said last-named means including means for eliminating the effects of undesirable disturbing forces on said gyroscopes, a compass card controlled by said horizontal gyroscope and viewable through the cover glass of the casing for indicating the true meridian, and indicating means controlled by the vertical gyroscope and also viewable through the cover glass for indicating the true horizontal plane in the field of view of and coincidentally with the periphery of the compass card so that substantial horizontal alignment of said compass card and said indicating means indicates that the spin axis of the horizontal gyroscope is in a plane parallel to the earth's surface.

5. A combined horizon indicator and gyro-compass for aircraft, comprising a fixed support, a frame, a gyroscope mounted in said frame with its spin axis horizontal, a second gyroscope mounted in said frame with its spin axis vertical, means including said frame and providing a gimbal mounting for said gyroscopes on said fixed support to permit simultaneous movement of the spin axes of said gyroscopes about two mutually perpendicular horizontal axes relative to said fixed support and to permit precession of the spin axis of the horizontal gyroscope in azimuth, a compass card controlled by said horizontal gyroscope and movable therewith upon precession thereof, an indicator controlled by said vertical gyroscope, and a common reference member against which said compass card and indicator are correlated so that coincidence of the card, the indicator, and the reference member along a horizontal line indicates level flight in a direction shown on the compass card by the reference member.

6. In combination, an instrument casing adapted for mounting on a substantially vertical instrument panel and having a cover-glass at the front thereof, a pair of gyroscopes mounted in said casing with their spin axes horizontal and vertical, respectively, gimbals in said casing and carrying said gyroscopes for simultaneous movement of their spin axes about two mutually perpendicular horizontal axes, means for maintaining the spin axes of said gyroscopes horizontal and vertical, respectively, and for causing the axis of the horizontal gyroscope to align itself parallel with the plane of the meridian, thereby making the vertical gyroscope function as a gyro vertical and the horizontal gyroscope as a true meridian-seeking compass, and indicating means directly controlled by said gyroscopes and viewable through the cover-glass of the casing for indicating the true meridian and the true horizontal plane.

CLINTON H. HAVILL.